United States Patent
Kim et al.

(10) Patent No.: US 12,477,557 B2
(45) Date of Patent: *Nov. 18, 2025

(54) METHOD AND APPARATUS FOR TRANSMITTING AND RECEIVING DATA IN WIRELESS COMMUNICATION SYSTEM

(71) Applicant: Samsung Electronics Co., Ltd., Suwon-si (KR)

(72) Inventors: Youngbum Kim, Seoul (KR); Juho Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/432,684

(22) Filed: Feb. 5, 2024

(65) Prior Publication Data

US 2024/0179718 A1    May 30, 2024

Related U.S. Application Data

(63) Continuation of application No. 15/827,419, filed on Nov. 30, 2017, now Pat. No. 11,902,983.

(30) Foreign Application Priority Data

Nov. 30, 2016    (KR) .................. 10-2016-0162268

(51) Int. Cl.
*H04L 5/00*    (2006.01)
*H04L 1/1829*    (2023.01)
(Continued)

(52) U.S. Cl.
CPC .......... *H04W 72/23* (2023.01); *H04L 1/1835* (2013.01); *H04L 5/0033* (2013.01);
(Continued)

(58) Field of Classification Search
CPC .......... H04W 72/042; H04W 72/0486; H04W 52/0209; H04L 5/0073; H04L 1/1835;
(Continued)

(56) References Cited

U.S. PATENT DOCUMENTS

2013/0114570 A1    5/2013    Park et al.
2014/0050130 A1    2/2014    Kim et al.
(Continued)

FOREIGN PATENT DOCUMENTS

| CN | 103069763 A | 4/2013 |
|---|---|---|
| CN | 103548409 A | 1/2014 |
| WO | 2012/154004 A2 | 11/2012 |

OTHER PUBLICATIONS

InterDigital Communications—On the Operation of Grant—Free Access (3GPP TSG RAN WG1, R1-1612685), Nov. 2016, p. 1-4.*
Nokia (Grant-free to grant-based switching for URLLC, R1-1612253, Nov. 14-18, 2016).*
Korean Office Action with English translation dated Feb. 22, 2024; Korean Appln. No. 10-2016-0162268.
(Continued)

*Primary Examiner* — Lakeram Jangbahadur
(74) *Attorney, Agent, or Firm* — Jefferson IP Law, LLP

(57) ABSTRACT

The present disclosure relates to a $5^{th}$ generation 5G) or pre-5G communication system for supporting higher data rates beyond a $4^{th}$ generation (4G) communication system such as long-term evolution (LTE). A method for a base station (BS) are provided. The method includes receiving signals from at least one terminal, decoding a signal having a signal strength that is higher than a threshold value among the received signals, identifying whether a resource through which the signal has been transmitted is included in an overlap region in which a first resource region dynamically allocated by control information and a second resource region predetermined by configuration information overlap each other if the decoding of the signal fails, and skipping
(Continued)

storage of the received signal in a buffer if the resource through which the signal has been transmitted is included in the overlap region.

10 Claims, 14 Drawing Sheets

(51) Int. Cl.
    *H04W 72/23*     (2023.01)
    *H04W 72/52*     (2023.01)
    *H04W 52/02*     (2009.01)

(52) U.S. Cl.
    CPC .......... *H04L 5/0055* (2013.01); *H04L 5/0073* (2013.01); *H04W 72/52* (2023.01); *H04L 5/006* (2013.01); *H04L 5/0092* (2013.01); *H04W 52/0209* (2013.01)

(58) Field of Classification Search
    CPC ..... H04L 5/0033; H04L 5/0055; H04L 5/006; H04L 5/0092
    See application file for complete search history.

(56) References Cited

U.S. PATENT DOCUMENTS

| | | | |
|---|---|---|---|
| 2014/0079012 A1 | 3/2014 | Kim et al. | |
| 2014/0126507 A1* | 5/2014 | Takahashi | H04L 1/1893 370/329 |
| 2015/0195063 A1* | 7/2015 | Ro | H04L 5/0053 370/329 |
| 2015/0215930 A1* | 7/2015 | Kim | H04B 7/0626 370/329 |
| 2016/0234830 A1 | 8/2016 | Kim et al. | |
| 2020/0045705 A1* | 2/2020 | Chae | H04W 72/20 |

OTHER PUBLICATIONS

Korean Office Action with English translation dated Oct. 31, 2024; Korean Appln. No. 10-2016-0162268.
ERICSSON; Skipping padding in SPS- and dynamic grants; 3GPP TSG-RAN WG2 #91bis Tdoc; R2-154742; Malmö, Sweden; Oct. 5-9, 2015; Sep. 25, 2015.
Huawei et al.; Discussion on grant-free versus grant-based transmissions for infrequent small packets; 3GPP TSG RAN WG1 Meeting #86bis; R1-1608858; Lisbon, Portugal; Oct. 10-14, 2016; Oct. 1, 2016.
Catt et al.; Analysis on resource efficiency of uplink access solutions; 3GPP TSG RAN WG2 Meeting #91bis; R2-154122; Malmö, Sweden; Oct. 5-9, 2015; Sep. 26, 2015.
Huawei et al.; Contention based uplink transmission; 3GPP TSG-RAN WG2 Meeting #91bis; R2-154191; Malmö, Sweden; Oct. 5-9, 2015; Sep. 26, 2015.
Korean Notice of Allowance with English translation dated Feb. 21, 2025; Korean Appln. No. 10-2016-0162268.
Interdigital Communications, On the Operation of Grant-Free Access, 3GPP TSG RAN WG1 Meeting #87, R1-1612685, Reno, USA, Nov. 13, 2016.
Nokia, Alcatel-Lucent Shanghai Bell, Grant-free to grant-based switching for URLLC, 3GPP TSG-RAN WG1 #87, R1-1612253, Reno, USA, Nov. 13, 2016.
Nokia, Alcatel-Lucent Shanghai Bell, Grant-free HARQ for URLLC, 3GPP TSG-RAN WG1#87, R1-1612252, Reno, NV, USA, Nov. 13, 2016.
Intel Corporation, Downlink URLLC transmission and multiplexing with eMBB, 3GPP TSG RAN WG1 Meeting #87, R1-1612003, Reno, USA, Nov. 13, 2016.
Huawei et al., The retransmission and HARQ schemes for grant-free, 3GPP TSG RAN WG1 Meeting #86bis, R1-1608859, Lisbon, Portugal, Oct. 9, 2016.
Chinese Office Action dated Apr. 25, 2022, issued in Chinese Application No. 201711242565.0.

* cited by examiner

METHOD AND APPARATUS FOR TRANSMITTING AND RECEIVING DATA IN WIRELESS COMMUNICATION SYSTEM

CROSS-REFERENCE TO RELATED APPLICATION(S)

This application is a continuation application of prior application Ser. No. 15/827,419 filed on Nov. 30, 2017, which has issued as U.S. Pat. No. 11,902,983 on Feb. 13, 2024; and which is based on and claims the benefit under 35 U.S.C. § 119(a) of a Korean patent application filed on Nov. 30, 2016 in the Korean Intellectual Property Office and assigned Serial number 10-2016-0162268, the entire disclosure of each of which is hereby incorporated by reference.

TECHNICAL FIELD

The present disclosure relates to a cellular wireless communication system. More particularly, to a method for a base station (BS) to transmit and receive data.

BACKGROUND

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a 'Beyond 4G Network' or a 'Post long-term evolution (LTE) System'.

The 5G communication system is considered to be implemented in higher frequency (mm Wave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (COMP), reception-end interference cancellation and the like.

In the 5G system, Hybrid frequency-shift keying (FSK) and quadrature amplitude modulation (QAM) Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed. On the other hand, in the 5G communication system, support for various services, as compared with the existing 4G communication system, has been considered. For example, as the most representative services, an enhanced mobile broadband (eMBB), ultra-reliable and low latency communications (URLLC), massive machine type communications (massive machine-type communication (MTC)), and evolved multimedia broadcast/multicast service (eMBMS) have been discussed.

The URLLC service is a service that is newly considered in the 5G communication system in contrast with the existing 4G communication system, and requires satisfaction of ultra-reliability (packet error rate of 10-5) and low latency (0.5 msec) conditions as compared with other services. For example, the URLLC service may be used for services for autonomous driving, e-health, and drones.

However, as the amount of resources allocated to provide the URLLC service (hereinafter referred to as "URLLC resources") becomes larger, the amount of resources to be used for other services becomes smaller. Accordingly, in providing the URLLC service and other services together within limited resources, collision may occur between the URLLC resources and resources for providing other services, and this may cause data transmission/reception efficiency to be reduced.

Accordingly, there is a need for a method for transmitting and receiving data through an efficient use of radio resources.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method for a base station (BS) to transmit and receive data through an efficient use of radio resources in a wireless communication system.

In accordance with an aspect of the present disclosure, a method for a BS is provided. The method includes receiving signals from at least one terminal, decoding a signal having a signal strength that is higher than a threshold value among the received signals, identifying whether a resource through which the signal has been transmitted is included in an overlap region in which a first resource region dynamically allocated by control information and a second resource region predetermined by configuration information overlap each other if the decoding of the signal fails, and skipping storage of the received signal in a buffer if the resource through which the signal has been transmitted is included in the overlap region.

In accordance with another aspect of the present disclosure, a BS is provided. The BS includes a transceiver, and a controller configured to receive the signals from at least one terminal, decode a signal having a signal strength that is higher than a threshold value among the received signals, identify whether a resource through which the signal has been transmitted is included in an overlap region in which a first resource region dynamically allocated by control information and a second resource region predetermined by configuration information overlap each other if the decoding of the signal fails, and skip storage of the received signal in a buffer if the resource through which the signal has been transmitted is included in the overlap region.

According to the aspects of the present disclosure, by defining a method for a BS to transmit/receive data to/from a terminal in a wireless communication system, radio resources can be efficiently used, and transmission delay can be reduced.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
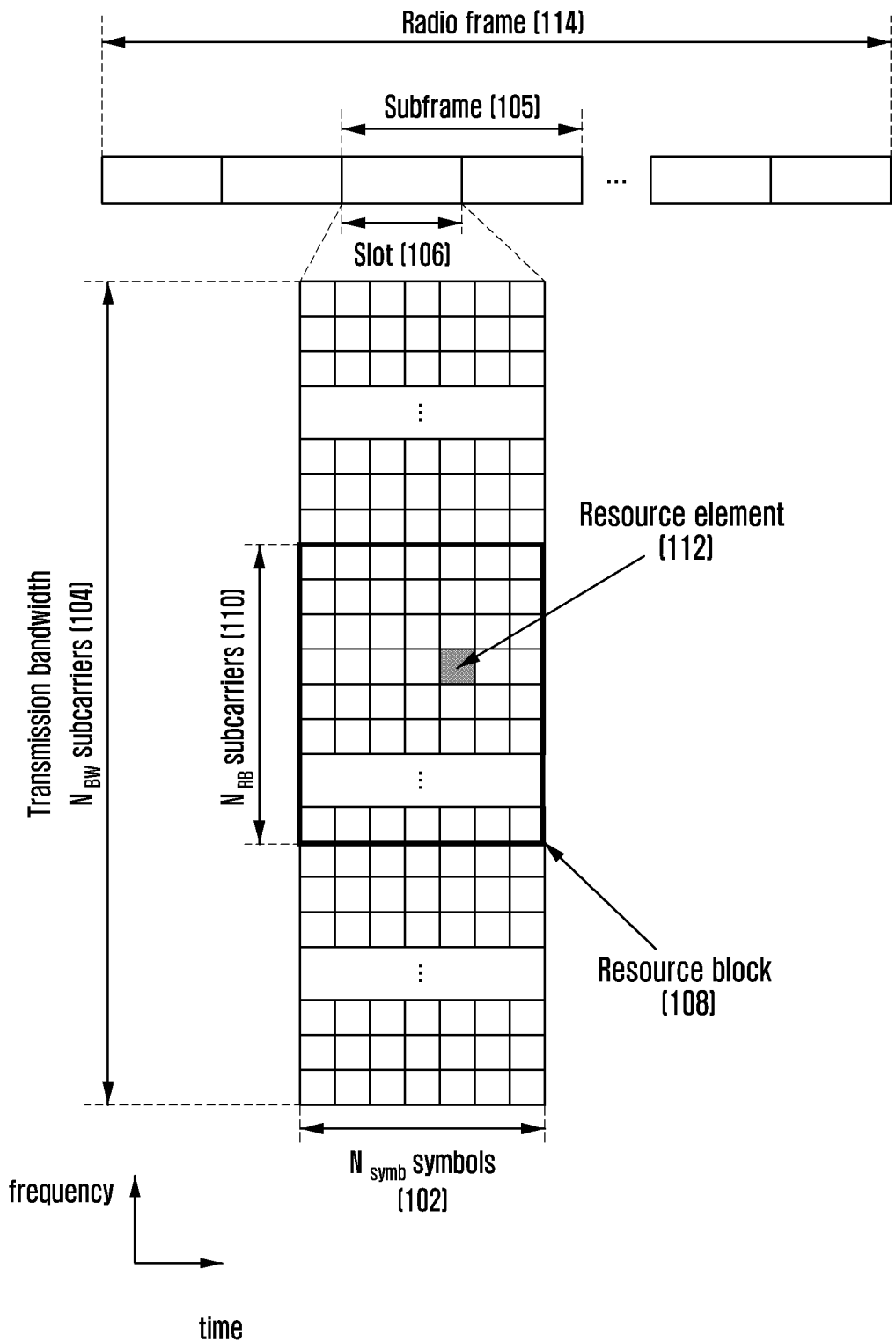
FIG. 1 is a diagram illustrating the basic structure of a time-frequency resource region in a long-term evolution (LTE) or LTE advanced (LTE-A) system according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Hereinafter, a base station (BS) is a subject that performs resource allocation to a terminal, and may be at least one of an eNode B (or eNB), gNode B (or gNB), Node B, BS, radio connection unit, BS controller, and node on a network. The terminal may include user equipment (UE), mobile station (MS), cellular phone, smart phone, computer, or multimedia system capable of performing a communication function. In the present disclosure, a downlink (DL) is a radio transmission path of a signal that is transmitted from the BS to the terminal, and an uplink (UL) means a radio transmission path of a signal that is transmitted from the terminal to the BS. Further, embodiments of the present disclosure to be described hereinafter may also be applied to other communication systems having similar technical backgrounds or channel types. Further, the embodiments of the present disclosure may also be applied to other communication systems through partial modifications thereof in a range that does not greatly deviate from the scope of the present disclosure through the judgment of those skilled in the art.

In explaining embodiments of the present disclosure, explanation of technical contents which are well known in the art to which the present disclosure pertains and are not directly related to the present disclosure will be omitted. This is to transfer the subject matter of the present disclosure more clearly without obscuring the same through omission of unnecessary explanations.

For the same reason, in the accompanying drawings, sizes and relative sizes of some constituent elements may be exaggerated, omitted, or briefly illustrated. Further, sizes of the respective constituent elements do not completely reflect the actual sizes thereof. In the drawings, the same drawing reference numerals are used for the same or corresponding elements across various figures.

In this case, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide operations for implementing the functions specified in the flowchart block or blocks.

Also, each block of the flowchart illustrations may represent a module, segment, or portion of code, which includes one or more executable instructions for implementing the specified logical function(s). It should also be noted that in some alternative implementations, the functions noted in the blocks may occur out of order. For example, two blocks shown in succession may in fact be executed substantially concurrently or the blocks may sometimes be executed in the reverse order, depending upon the functionality involved.

The term "~unit", as used in an embodiment, means, but is not limited to, a software or hardware component, such as field programmable gate array (FPGA) or application-specific integrated circuit (ASIC), which performs certain tasks. However, "~unit" does not mean to be limited to software or hardware. The term "~unit" may advantageously be configured to reside on the addressable storage medium and configured to execute on one or more processors. Thus, "~unit" may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and "~units" may be combined into fewer components and "~units" or further separated into additional components and "~units". Further, the components and "~units" may be implemented to operate one or more CPUs in a device or a security multimedia card. Further, in an embodiment, "~unit" may include one or more processors.

Recently, in order to process an explosively increasing mobile data traffic, there has been a lively discussion on a 5th generation (5G) system or new radio access technology (NR), which is the next-generation communication system after a long term evolution (LTE) or evolved universal terrestrial radio access (E-UTRA) system and an LTE-advanced (LTE-A) or E-UTRA evolution system. As compared with the existing mobile communication system that gives priority to typical voice/data communication, the 5G system takes aim at various services, such as an enhanced mobile broadband (eMBB) service for improvement of the existing voice/data communication, an ultra-reliable and low latency communication (URLLC) service, and a massive machine-type communication (MTC) service for supporting a massive machine-type communication, and satisfaction of requirements for the respective services.

The system transmission bandwidth for a single carrier in the existing LTE and LTE-A is limited to 20 MHz at maximum, whereas the main target of the 5G system is to achieve an ultrahigh-speed data service that reaches several Gbps using an ultra broadband that is incredibly wider than the system transmission bandwidth. Accordingly, the 5G system considers an ultrahigh frequency band of several to 100 GHz at maximum, in which an ultra-broadband frequency can be secured relatively easily, as a candidate frequency band. In addition, it is also considered to secure a broadband frequency for the 5G system through frequency redeployment or allocation among frequency bands included in a range of several hundred MHz to several GHz that is used in the existing mobile communication system.

The ultrahigh frequency band of several tens of GHz has the wavelength of a radio wave at the level of several millimeters (mm), and thus it may be called a millimeter wave (mmWave). However, in the ultrahigh frequency band, a path loss of the radio wave is increased in proportion to the frequency band, and thus the coverage of the mobile communication system is decreased.

In order to overcome the drawback of the coverage decrease of the ultrahigh frequency band, a beamforming technology has become important, which increases an arrival distance of the radio wave through concentration of radiation energy of the radio wave on a specific target point using a plurality of array antennas. The beamforming technology can be applied to not only a transmission end but also a reception end. In addition to the coverage increase effect, the beamforming technology also has the effect of reducing interference in regions excluding the beamforming direction. In order for the beamforming technology to operate properly, a method for achieving an accurate measurement of transmitted or received beams and a feedback of the measured beams is necessary.

As another requirement of the 5G system, an ultra-low latency service having about 1 ms or less of transmission delay between the transmission end and the reception end is required. As one scheme for reducing the transmission delay, it is necessary to design a frame structure based on transmit time interval (TTI) that is shorter than that of the LTE or LTE-A system.

The TTI is a reference unit to perform scheduling, and the TTI of the existing LTE or LTE-A system may be 1 ms corresponding to the length of one subframe. Further, a short TTI may be used to satisfy the requirements of the ultra-low latency service of the 5G system, and for example, the TTI of the 5G system may be 0.5 ms, 0.2 ms, or 0.1 ms that is shorter than that of the existing LTE or LTE-A system. In the following description, unless specially mentioned, the TTI and the subframe may be basic units for scheduling, and may be mixedly used to indicate specific determined time intervals.

Hereinafter, with reference to the drawings, the frame structure of an LTE or LTE-A system and the design direction of a 5G system will be described.

FIG. 1 is a diagram illustrating the basic structure of a time-frequency resource region in an LTE or LTE-A system according to an embodiment of the present disclosure.

Referring to FIG. 1, a horizontal axis represents a time domain, and a vertical axis represents a frequency domain. AUL may mean a radio link for transmitting data or a control signal from a terminal to a BS, and a DL may mean a radio link for transmitting data or a control signal from the BS to the terminal. In the time domain of the LTE or LTE-A system, the minimum transmission unit is an orthogonal frequency division multiplexing (OFDM) symbol in the case of the DL, and the minimum transmission unit is a single carrier—frequency division multiple access (SC-FDMA) symbol in the case of the UL.

In this case, $N_{symb}$ symbols 102 are gathered to constitute one slot 106, and two slots are gathered to constitute one subframe 105. The length of the slot is 0.5 ms, and the length of the subframe is 0.1 ms. Further, a wireless frame or a radio frame 114 is a time domain interval composed of 10 subframes.

The minimum transmission unit in the frequency domain is a subcarrier in the unit of 15 kHz (subcarrier spacing=15 kHz), and the transmission bandwidth of the whole system may be composed of $N_{BW}$ subcarriers 104 in total.

In the time-frequency domain, the basic unit of a resource is a resource element (RE) 112, and it may be indicated as an OFDM symbol or an SC-FDMA symbol index and a subcarrier index. A resource block (RB) 108 or a physical RB (PRB) may be defined as $N_{symb}$ successive OFDM symbols 102 in the time domain and $N_{RB}$ successive subcarriers 110 in the frequency domain. Accordingly, one RB 108 may be composed of $N_{symb} \times N_{RB}$ REs 112.

In the LTE or LTE-A system, data is mapped in an RB unit, and the BS may perform scheduling in the unit of an RB pair constituting one subframe with respect to the terminal. The number of SC-FDMA symbols or the number of OFDM symbols $N_{symb}$ is determined in accordance with the length of a cyclic prefix (CP) that is added for each symbol to prevent inter-symbol interference. For example, if a normal CP is applied, the number of OFDM symbols $N_{symb}$ may become $N_{symb}=7$, whereas if an extended CP is applied, the number of OFDM symbols $N_{symb}$ may become $N_{symb}=6$. The extended CP may be applied to a system having a relatively longer radio wave transmission distance than that of the normal CP to maintain orthogonality between symbols.

The subcarrier spacing and the CP length are essential information for OFDM transmission/reception, and smooth transmission/reception can be performed only if the BS and the terminal recognize such information as their common values.

The numbers $N_{BW}$ and $N_{RB}$ are in proportion to the bandwidth of the system transmission band. The data rate may increase in proportion to the number of RBs that are scheduled for the terminal.

As described above, the frame structure of the LTE or LTE-A system is designed in consideration of a typical voice or data communication, and thus it has a limited expandability in satisfying various services and requirements as in the 5G system. Accordingly, in the 5G system, in consideration of the various services and requirements, it is required to flexibly define and operate the frame structure.

Figure 2:
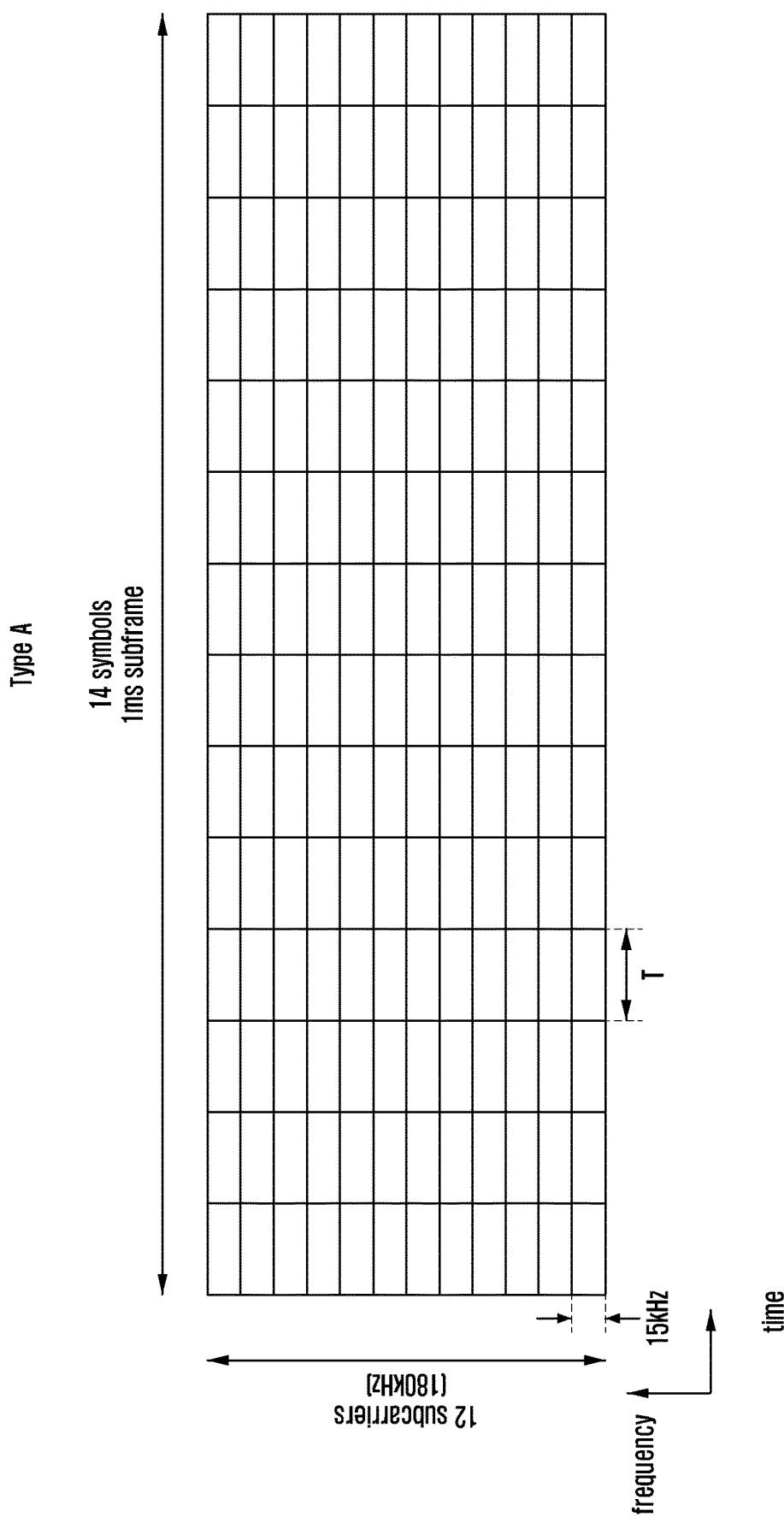
FIG. 2 is a diagram illustrating an example of an extended frame structure according to an embodiment of the present disclosure.
Figure 3:
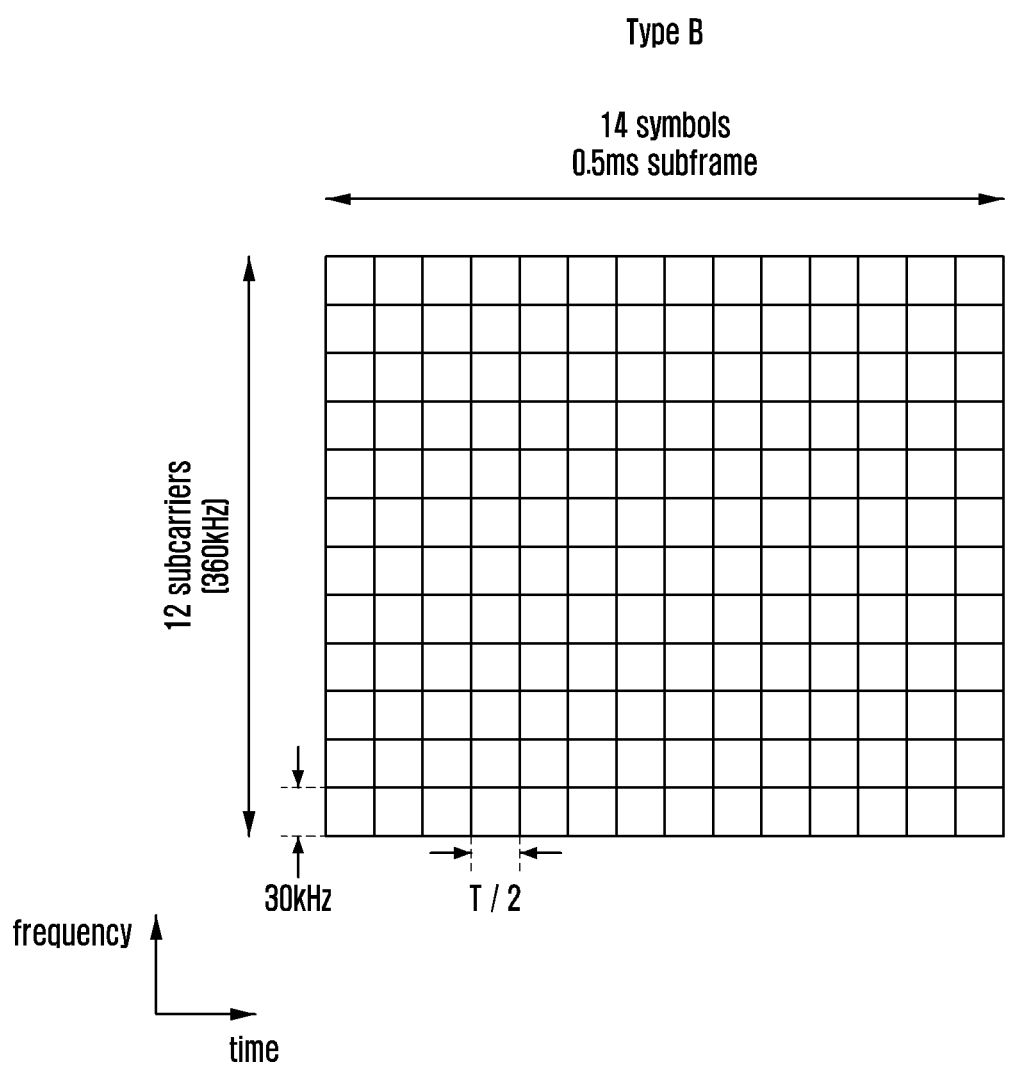
FIG. 3 is a diagram illustrating another example of an extended frame structure according to an embodiment of the present disclosure.
Figure 4:
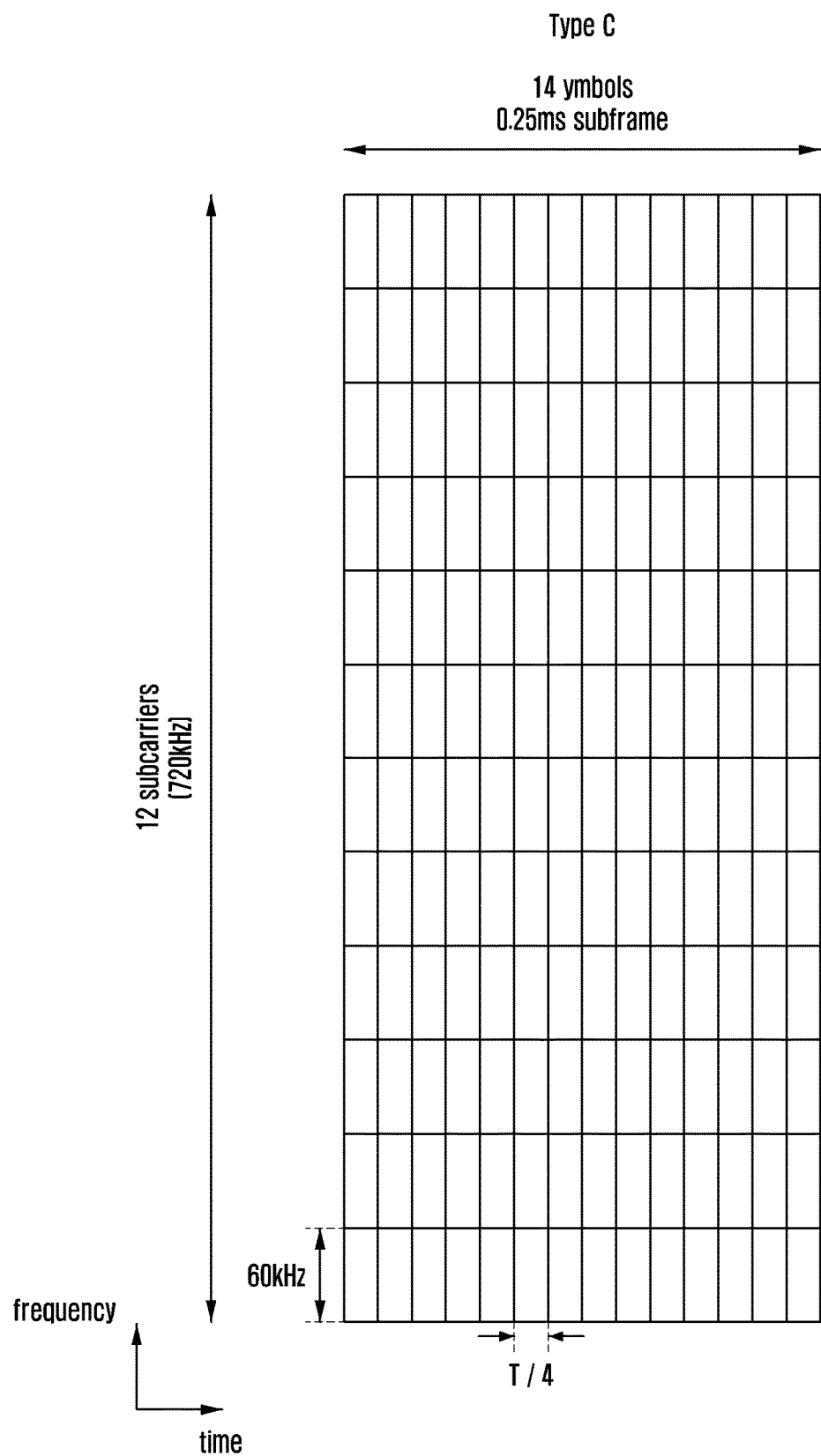
FIG. 4 is a diagram illustrating still another example of an extended frame structure according to an embodiment of the present disclosure.

FIGS. 2, 3, and 4 illustrate examples of an extended frame structure.

In examples of FIGS. 2, 3, and 4, it is exemplified that an essential parameter set for defining an extended frame structure includes a subcarrier spacing, a CP length, and a subframe length.

In an initial stage in which a 5G system is to be introduced, at least coexistence with the existing LTE/LTE-A system or dual-mode operation is expected. Through this, the existing LTE/LTE-A system may provide a stable system operation, and the 5G system may serve to provide improved services. Accordingly, the extended frame structure of the 5G system is required to include at least the LTE/LTE-A frame structure or an essential parameter set.

FIG. 2 illustrates a 5G frame structure like a frame structure of LTE/LTE-A or an essential parameter set according to an embodiment of the present disclosure.

Referring to FIG. 2, a frame structure type A has a subcarrier spacing of 15 kHz, 14 symbols constitute a subframe of 1 ms, and 12 subcarriers (=180 kHz=12×15 kHz) constitute a PRB.

FIG. 3 is a diagram illustrating another example of an extended frame structure according to an embodiment of the present disclosure.

Referring to FIG. 3, a frame structure type B is illustrated. The frame structure type B has a subcarrier spacing of 30 kHz, 14 symbols constitute a subframe of 0.5 ms, and 12 subcarriers (=360 kHz=12×30 kHz) constitute a PRB.

That is, the frame structure type B may be configured to have the subcarrier spacing and the PRB size that are twice those of the frame structure type A, and to have the subframe length and the symbol length that are twice less than those of the frame structure type A.

FIG. 4 is a diagram illustrating the frame structure of a 5G system according to an embodiment of the present disclosure.

Referring to FIG. 4, the frame structure types exemplified in FIGS. 2 to 4 may be correspondingly applied to various scenarios. As described above, the frame structure type A may be configured to have the symbol and subframe lengths that are longer than those of the frame structure type B or C, and to have the subcarrier spacing and the PRB size that are smaller than those of the frame structure type B or C.

From the viewpoint of a cell size, as the CP length is longer, a larger cell can be supported. Accordingly, the frame structure type A having the longest subframe length can support a relatively large cell as compared with the frame structure type B or C.

From the viewpoint of an operating frequency band, as the subcarrier spacing is larger, it is more advantageous to restore phase noises of a high frequency band. Accordingly, the frame structure type C having the largest subcarrier spacing can support a relatively high operating frequency as compared with the frame structure type A or B.

Figure 5:
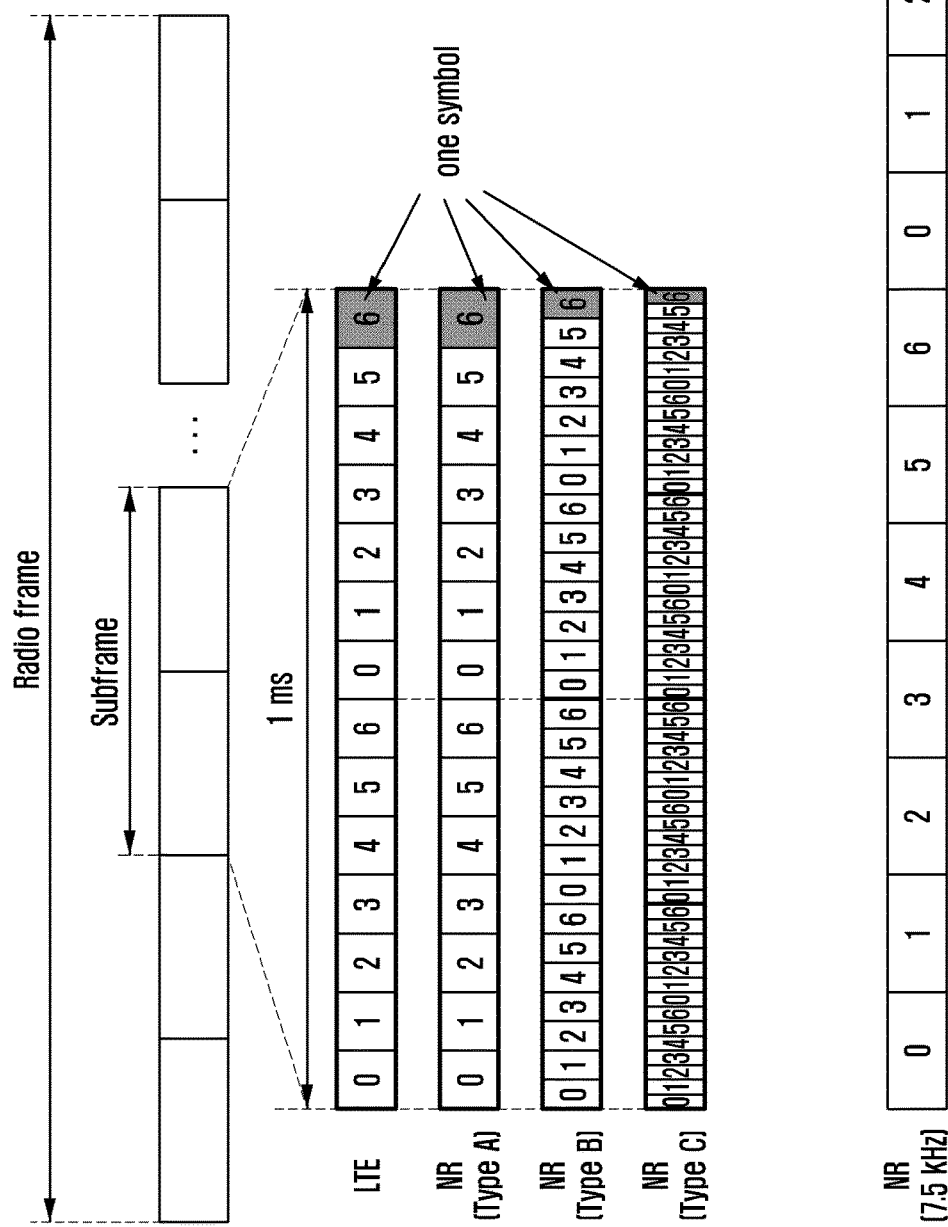
FIG. 5 is a diagram illustrating a frame structure of a 5th generation (5G) system according to an embodiment of the present disclosure.

FIG. 5 is a diagram illustrating a frame structure of a 5G system according to an embodiment of the present disclosure.

Referring to FIG. 5, from the viewpoint of a service, as the subframe length is shorter, it is more advantageous to support an ultra-low latency service such as URLLC. Accordingly, the frame structure type C having the shortest subframe length is relatively suitable to the URLLC service as compared with the frame structure type A or B.

Figure 6:
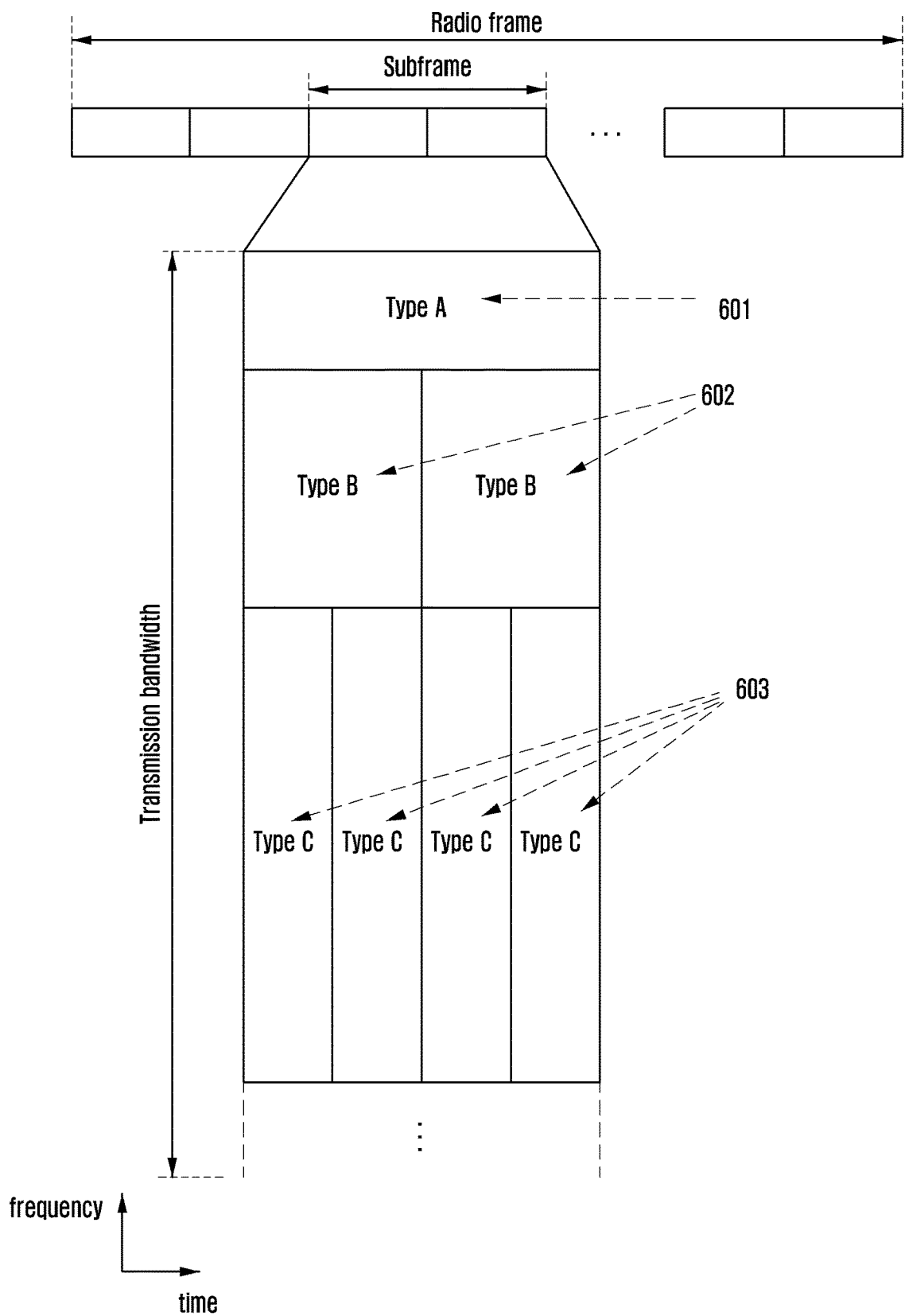
FIG. 6 is a diagram illustrating a method for multiplexing different frame structures in a 5G system according to an embodiment of the present disclosure.

Further, a scenario in which the frame structure types are multiplexed and integrally operated in one system may be considered. FIG. 6 shows an example in which the frame structure types A, B, and C are multiplexed in one system.

FIG. 6 is a diagram illustrating a method for multiplexing different frame structures in a 5G system according to an embodiment of the present disclosure.

Referring to FIG. 6, in the 5G system, frame structure types A, B, and C 601, 602, and 603 may be multiplexed in one system.

That is, by maintaining the frame structure types defined in the essential parameter set in an integer multiple relationship, resource mapping can be smoothly performed in the subframe or the PRB even in the case of the multiplexing as illustrated in FIG. 6.

However, the drawing is to explain an example of multiplexing the frame structure. Accordingly, deployment of the frame structure types A, B, and C 601, 602, and 603 may differ.

In the same manner as the LTE or LTE-A system, even in the 5G system, a hybrid automatic repeat request (HARQ) method may be applied to heighten data transmission efficiency. The HARQ method enables a receiver to transmit information (negative acknowledgement (NACK)) for notifying a transmitter of decoding failure if the receiver is unable to accurately decode data transmitted by the transmitter, and thus it enables the transmitter to retransmit the corresponding data through a physical layer. The receiver heightens data reception performance through combining data retransmitted by the transmitter with the existing data of which the decoding has failed. Further, if the receiver has accurately decoded the data, it may transmit information (acknowledgement (ACK)) for notifying the transmitter of decoding success to cause the transmitter to transmit new data.

On the other hand, in order for the terminal to transmit data to the BS, the terminal should be basically configured to receive a grant of UL data transmission from the BS, so that no collision occurs with radio resources used by other terminals.

Figure 7:
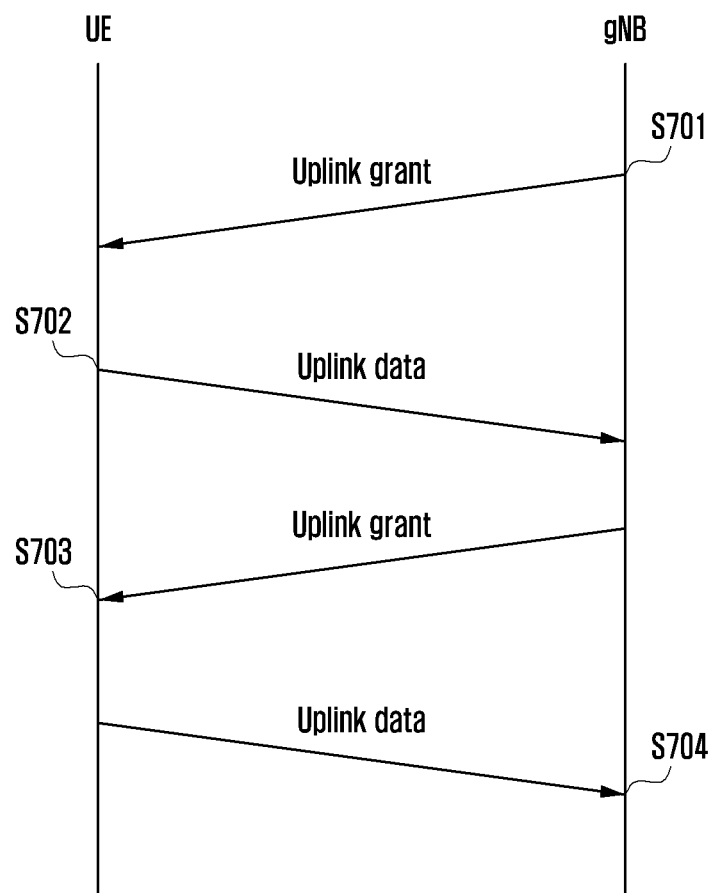
FIG. 7 is a diagram illustrating a procedure of transmitting grant-based uplink (UL) data according to an embodiment of the present disclosure.

FIG. 7 is a diagram illustrating a procedure of transmitting grant-based UL data according to an embodiment of the present disclosure.

Referring to FIG. 7, at operation S701, the BS may transmit an UL grant to the terminal. Since the BS transmits an UL grant to the terminal that intends to transmit UL data, it can notify the terminal what radio resource the terminal is to transmit the UL data through.

The UL grant may include DL control information (DCI), such as information on a radio resource to be used by the terminal, a modulation and coding method to be applied by the terminal for data transmission, control information indicating whether transmission is HARQ initial transmission, and a redundancy version (RV) of HARQ transmission.

The UL grant may be transmitted through a physical DL control channel (PDCCH).

At operation S702, the terminal may transmit the UL data to the BS. The terminal may transmit the UL data using the corresponding radio resource allocated in accordance with the UL grant transmitted by the BS. The UL grant may include resource information allocated for the terminal to transmit the UL data, and the terminal may transmit the UL data through the allocated radio resource.

As described above, the terminal may transmit the UL data through the radio resource dynamically allocated in accordance with the UL grant.

If the UL data transmitted by the terminal is received, the BS may determine whether the data has been successfully received through decoding of the received data. If the UL data has been successfully received, the BS may complete the reception operation for the corresponding data.

In contrast, if the reception of the UL data has failed, the BS may store the UL data in an HARQ buffer.

Further, at operation S703, the BS may transmit the UL grant to the terminal. The UL grant may mean a retransmission UL grant instructing retransmission of the UL data.

Accordingly, at operation S704, the terminal may perform retransmission of the UL data. The terminal may retransmit the UL data transmitted at operation S702 through the resource allocated in accordance with the retransmission UL grant.

Figure 8:
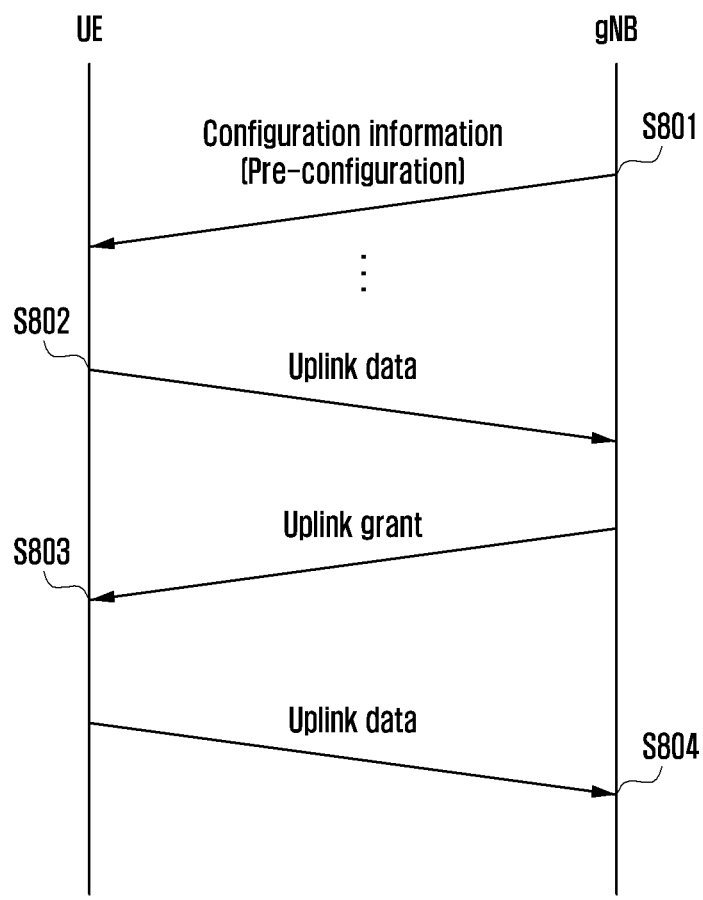
FIG. 8 is a diagram illustrating a procedure of transmitting grant-free UL data according to an embodiment of the present disclosure.

Accordingly, the BS that has received this may perform decoding through combining the UL data stored in a HARQ buffer with the retransmitted UL data. Through the data combining and decoding as described above, the decoding success probability can be heightened. On the other hand, in order for the terminal to transmit the UL data, it is necessary to exchange plural pieces of information between the BS and the terminal, and this may cause delay occurrence. Accordingly, it is possible to perform transmission of grant-free UL data in which a part or the whole of a UL grant transmission/reception process is omitted. Referring to FIG. 8, transmission of grant-free UL data will be described.

FIG. 8 is a diagram illustrating a procedure of transmitting grant-free UL data according to an embodiment of the present disclosure.

Referring to FIG. 8, at operation S801, the BS may transmit configuration information to the terminal. In this case, configuration information that the BS transmits to the terminal may include pre-information to be referred to by the terminal to transmit the UL data, and this may be called pre-configuration information. The pre-configuration information may include information on a radio resource to be used by the terminal for UL transmission and control information, such as a modulation and coding method to be applied by the terminal for data transmission. The configuration information may be transmitted to the terminal through radio resource control (RRC) signaling. Further, the pre-configuration information may be transmitted through a system information block (SIB). Further, the radio resource to be used by the terminal for the UL transmission may be predetermined. Further, the resource through which the BS can transmit the UL data may be predetermined.

Thereafter, if UL data transmission is necessary, the terminal, at operation S802, may transmit the UL data to the BS. The terminal may transmit the UL data to the BS in accordance with the received pre-configuration information.

If the UL data is received, the BS may determine whether the reception is successful through decoding of the received UL data. If the UL data is successfully received, the BS may complete the reception of the corresponding data.

In contrast, if the reception of the UL data has failed, the BS may store the UL data in an HARQ buffer.

Further, at operation S803, the BS may transmit an UL grant to the terminal. The UL grant may mean a retransmission UL grant instructing retransmission of the UL data. Since the detailed contents of the UL grant are the same as those as described above, a detailed explanation thereof will be omitted.

Accordingly, at operation S804, the terminal may perform retransmission of the UL data. The terminal may retransmit the UL data transmitted at operation S802 through the resource allocated in accordance with the retransmission UL grant.

On the other hand, as another method at operation S803, the BS may not transmit the retransmission UL grant, but may transmit to the terminal control information indicating an ACK/NACK against the received UL data.

Accordingly, if the control information indicating the ACK (hereinafter may be called "ACK information") is received, the terminal may not perform the UL retransmission. Further, if new UL data transmission is necessary, the terminal may transmit new UL data through a resource region predetermined in accordance with the pre-configuration information.

In contrast, if the control information indicating the NACK (hereinafter may be called "NACK information") is received, the terminal, at operation S804, may retransmit the UL data through the resource region predetermined in accordance with the pre-configuration information.

The grant-free UL data transmission method may be usefully applied to an ultra-low latency service because it is not necessary for the terminal that intends to transmit the UL data to wait for the UL grant every time.

Figure 9:
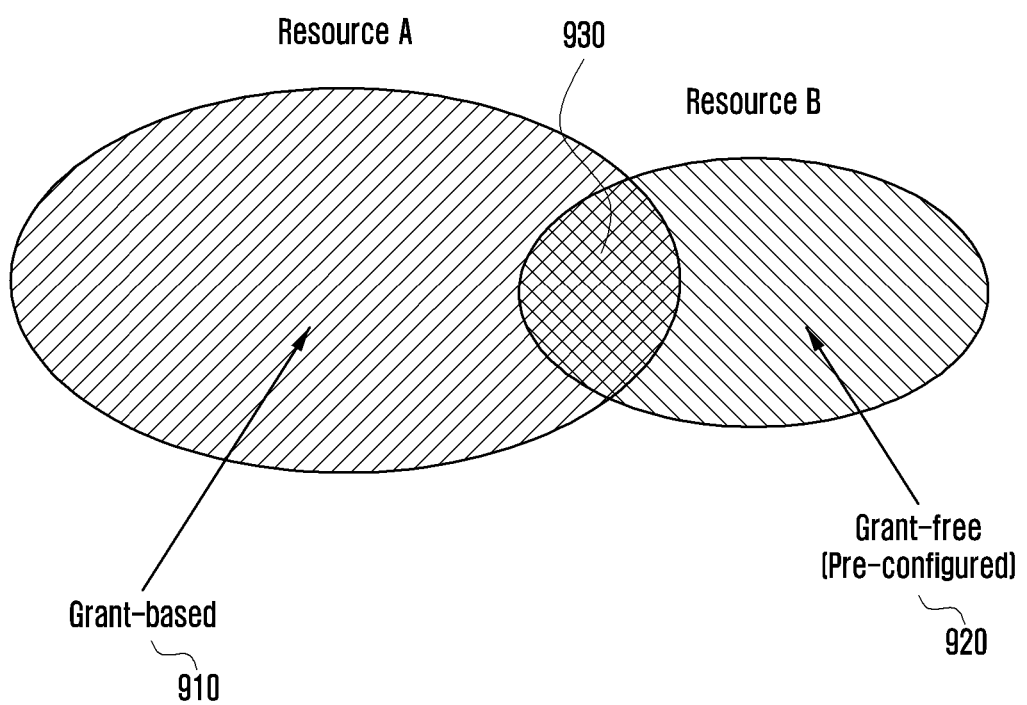
FIG. 9 is a diagram illustrating an example of a grant-based radio resource and a grant-free radio resource according to an embodiment of the present disclosure.

FIG. 9 is a diagram illustrating an example of a grant-based radio resource and a grant-free radio resource according to an embodiment of the present disclosure.

Referring to FIG. 9, it is preferable that the BS operates a radio resource for transmitting grant-based UL data (hereinafter referred to as "grant-based radio resource") 910 and a radio resource for transmitting grant-free UL data (hereinafter referred to as "grant-free radio resource") 920 separately from each other so that they do not overlap each other.

This is because the BS does not know in advance the time when terminal A actually uses a grant-free radio resource pre-configured to the terminal A, and if a radio resource allocated or permitted to terminal B through UL grant overlaps the grant-free radio resource, collision occurs between them to heighten the decoding failure probability. In the present disclosure, the grant-free radio resource may mean a pre-configured radio resource region, and the grant-based radio resource may mean a dynamically allocated radio resource region.

However, if many users exist in the system, the grant-based radio resource and the grant-free radio resource may partially overlap each other in order to efficiently use the limited radio resources.

Referring to FIG. 9, it can be confirmed that the grant-based radio resource A 910 and the grant-free radio resource B 920 are separately operated, but partial resources 930 overlap each other.

Accordingly, as described above, the terminal A and the terminal B can be allocated with the radio resource included in the overlap resource 930. Accordingly, in the case where the terminal A and the terminal B transmit the UL data using the overlap resource, collision may occur to heighten the decoding failure probability.

Figure 10:
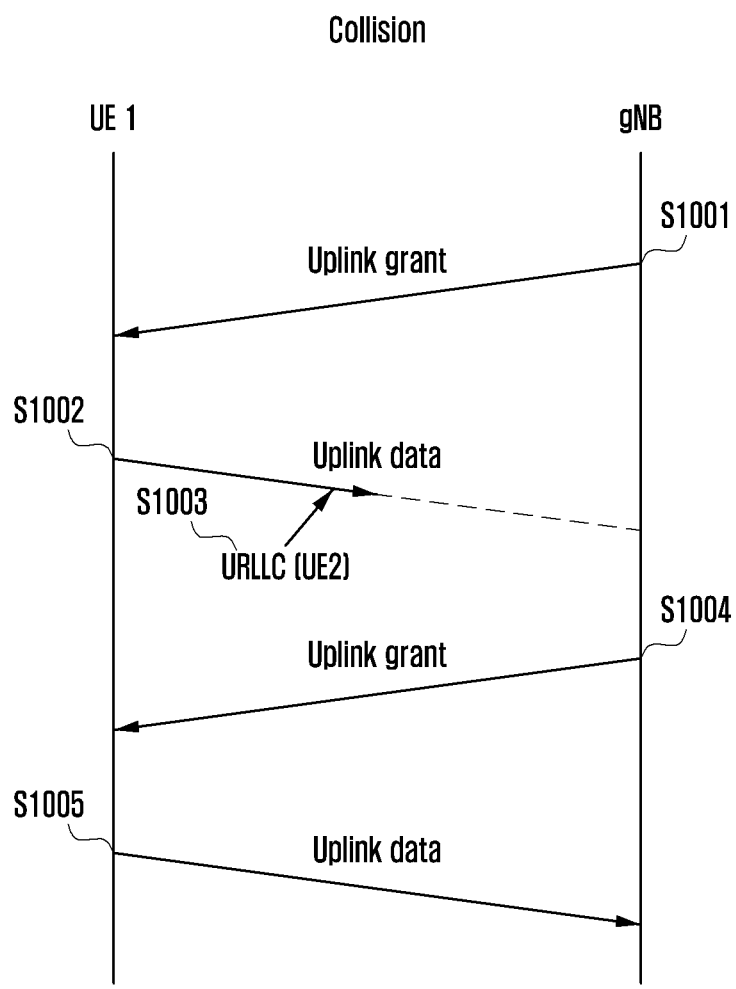
FIG. 10 is a diagram illustrating an example of collision occurring when UL data is transmitted between terminals according to an embodiment of the present disclosure.

FIG. 10 is a diagram illustrating an example of collision occurring when UL data is transmitted between terminals according to an embodiment of the present disclosure.

Referring to FIG. 10, an example in which collision occurs when terminals that use respective radio resources transmit UL data using an overlap resource in the case where a partial overlap between a grant-based radio resource and a grant-free radio resource is permitted is illustrated.

At operation S1001, a BS may transmit an UL grant to terminal 1. In the present disclosure, for convenience in explanation, a terminal that is dynamically allocated with a radio resource and performs UL transmission (performs grant-based transmission) may be called terminal 1 or a first terminal. Further, a terminal that performs UL transmission (performs grant-free transmission) in a predetermined radio resource region may be called terminal 2 or a second terminal. However, the scope of the present disclosure is not limited thereto, but the first terminal may perform the grant-free transmission while the second terminal may perform the grant-bases transmission.

Since the BS transmits the UL grant to the terminal 1 that intends to transmit UL data, it can notify the terminal what radio resource the terminal is to transmit the UL data through. As described above, the UL grant may include control information, and the detailed contents thereof are the same as those as described above.

At operation S1002, the terminal 1 may transmit the UL data to the BS. The terminal 1 may transmit the UL data using the corresponding radio resource allocated in accordance with the UL grant transmitted by the BS.

On the other hand, in the example of FIG. 10, it is assumed that the terminal 2 is allocated with a grant-free radio resource from the BS in advance. That is, it is assumed that the terminal 2 is allocated with a predetermined radio resource region for UL data transmission through configuration information.

At operation S1003, the terminal 2 may transmit the UL data using the overlap radio resource at a time when the terminal 1 transmits the UL data. Accordingly, the UL data transmission performed by the terminal 1 and the terminal 2 may act as mutual interference, and this may cause the UL data reception success probability of the BS to be remarkably lowered. If the reception of the UL data has failed, the BS may store the UL data in an HARQ buffer.

Further, at operation S1003, the BS may transmit the UL grant to the terminal 1. The UL grant may mean a retransmission UL grant instructing retransmission of the UL data.

Accordingly, at operation S1004, the terminal 1 may perform retransmission of the UL data. The terminal 1 may retransmit the UL data transmitted at operation S1005 in accordance with the retransmission UL grant.

If needed, the BS may perform decoding through combining the retransmitted UL data of the terminal 1 with the UL data stored in the HARQ buffer. In this case, since the UL data stored in the HARQ buffer includes not only the UL data of the terminal 1 but also the UL data of the terminal 2 due to the interference, the decoding success probability may be lowered.

Figure 11:
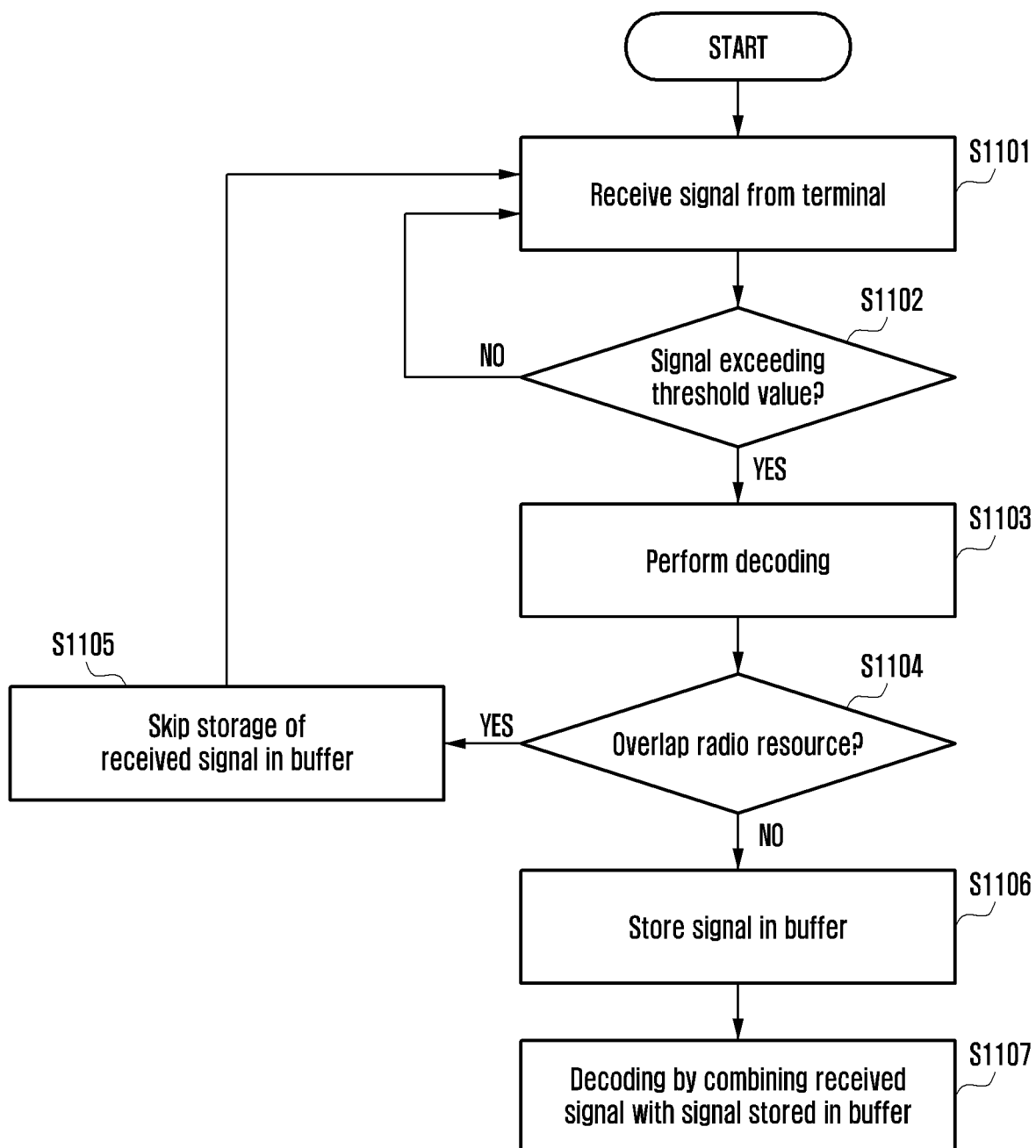
FIG. 11 is a diagram illustrating an operation of a base station (BS) according to an embodiment of the present disclosure.

FIG. 11 is a diagram illustrating an operation of a BS according to an embodiment of the present disclosure.

Referring to FIG. 11, at operation S1101, a BS may receive a signal from at least one terminal. The signal may include a control signal and data.

In this case, the BS may dynamically allocate a radio resource to the first terminal using control information (or UL grant), and may allocate a predetermined radio resource region to the second terminal using configuration information. In this case, the control information may mean a DCI transmitted through a PDCCH, and the configuration information may mean information transmitted through RRC signaling. Since the detailed contents thereof are the same as those as described above, a detailed explanation thereof will be omitted.

Accordingly, the first terminal dynamically allocated with the radio resource and the second terminal allocated with the predetermined radio resource region may transmit the signals. In this case, the configuration information may include pre-configuration information related to the predetermined radio resource region.

Further, at operation S1102, the BS may determine whether a signal that exceeds a threshold value exists. The BS may confirm whether the signal is received in the radio resource region allocated to the terminal, and may determine whether the signal that exceeds the threshold value exists among the received signals.

In this case, the threshold value may be dynamically determined in accordance with the channel state, or may be predetermined.

A process of determining whether the signal that exceeds the threshold value exists may be called discontinuous transmission (DTX) detection, and the detailed contents thereof will be described later.

If the signal that exceeds the threshold value does not exist, the BS may determine that the terminal cannot receive the UL grant and thus has not transmitted data. Accordingly, the BS may perform the operation S1101 again. That is, the BS may retransmit the UL grant to the terminal, and may determine whether the signal that exceeds the threshold value exists.

In contrast, if the received signal that exceeds the threshold value exists, the BS, at operation S1103, may perform decoding of the received signal.

If the decoding has succeeded, the BS may transfer the decoding result to an upper layer and may complete the related processing. In contrast, if the decoding has failed, the BS, at operation S1104, may determine whether the resource through which the signal has been transmitted is an overlap radio resource (hereinafter may be mixedly used with an overlap region).

The overlap region may mean a region in which the dynamically allocated radio resource and the predetermined radio resource overlap each other. If the first terminal dynamically allocated with the radio resource region and the second terminal allocated with the predetermined radio resource region transmit signals using the overlap resources, the BS may fail to decode the received signals due to interference. However, the BS may fail to decode the signals due to various other causes, such as an error of a radio channel, rather than the collision of the radio resources. Accordingly, the BS may determine whether the decoding has failed due to the collision of the signals transmitted by the first terminal and the second terminal through determining whether the resource through which the signal has been transmitted is the overlap radio resource.

Accordingly, in the case of receiving the signal in the overlap region, the BS, at operation S1105, may skip an operation of storing the received signal in a buffer. That is, if the resource through which the signal has been transmitted is the overlap radio resource, the received signal may include both the UL data of the terminal 1 and the UL data of the terminal 2, and if the signal is combined with the subsequently received UL signal, the decoding success probability may be lowered.

However, even in the case of receiving the signal in the overlap region, the BS may store the received signal in the buffer through identifying the amount of radio resources included in the overlap region. If the amount of the radio resources included in the overlap region is small, the interference influence may be lowered. Accordingly, if the amount of the radio resources included in the overlap region is smaller than the threshold amount of resources, the BS may store the received signal in the buffer. However, a process of identifying the amount of radio resources included in the overlap region may be omitted.

Further, the BS may request the terminal to retransmit the data, and at operation S1101, it may receive the signal.

Specifically, the BS may transmit the UL grant for the retransmission to the first terminal, and the first terminal may retransmit the data using the radio resource information included in the UL grant. Further, in order to avoid interference with the signal transmitted by the second terminal, the BS may allocate the radio resources excluding the predetermined radio resource region to the first terminal.

Further, the BS may also request the second terminal to perform the retransmission. The BS may transmit the UL grant for the retransmission, or may request the retransmission using NACK information. In the case of using the UL grant, the BS may allocate resources excluding the overlap region in the predetermine region. Accordingly, the second terminal may retransmit data using the resource region allocated through the UL grant or the predetermined resource region. In this case, the BS may use various methods to identify the terminal that has transmitted the data. For example, the BS may dividedly allocate predetermined regions to respective terminals, and may identify which terminal it requests to perform retransmission through determining whether the overlap region through which the signal is received is the resource region allocated to any terminal. However, the scope of the present disclosure is not limited thereto. Further, the BS may omit the operation of requesting the second terminal to retransmit the data.

In contrast, if the resource through which the signal has been transmitted is not included in the overlap region, the BS, at operation S1106, may store the signal in the buffer. Further, the BS may request the first terminal to retransmit the data through transmission of the UL grant. Further, the BS may request the retransmission of the UL data through transmission of the UL grant or NACK information to the second terminal.

Accordingly, at operation S1107, the BS may receive the UL data again, and may combine the received data with the data stored in the buffer to perform the decoding.

Figure 12:
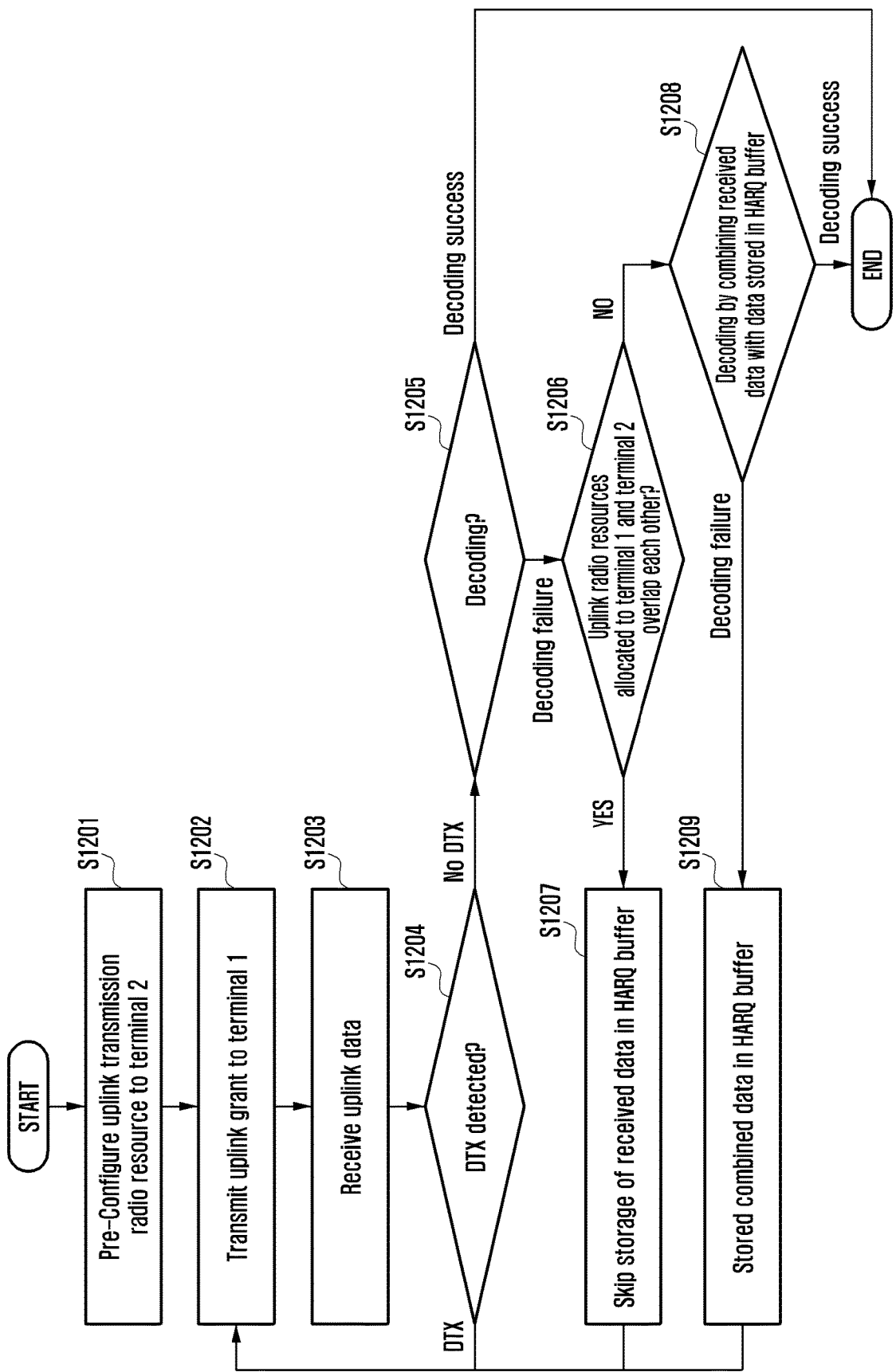
FIG. 12 is a diagram illustrating another operation of a BS according to an embodiment of the present disclosure.

FIG. 12 is a diagram illustrating another operation of a BS according to an embodiment of the present disclosure.

Referring to FIG. 12, at operation S1201, a BS may transmit configuration information to terminal 2. The BS may transmit to the terminal the configuration information including information for allocating a predetermined radio resource region (pre-configuration information). The BS may permit grant-free UL data transmission through pre-configuring a radio resource for UL transmission to the terminal 2.

As described above, the pre-configuration information may include information on a radio resource to be used by the terminal for UL transmission and control information, such as a modulation and coding method to be applied by the terminal for data transmission. The information on the radio resource included in the pre-configuration information may be predetermined or may be semi-statically determined by the BS.

Accordingly, if UL data to be transmitted is generated, the terminal 2 may transmit the UL data through a pre-allocated resource even if a separate UL grant is not received.

Further, at operation S1202, the BS may transmit an UL grant to the terminal 1. If there is the UL data to be transmitted to the terminal 1, the BS may permit grant-based UL data transmission through transmission of the UL grant. In this case, the UL grant may include control information, and the detailed contents thereof are the same as those as described above.

In the present disclosure, the terminal 1 and the terminal 2 are different terminals. As an example, the terminal 2 may be a terminal that supports an ultra-low latency service, and the terminal 1 may be a terminal that supports a normal data service.

Thereafter, at operation S1203, the BS may receive the UL data. The BS may receive the UL data through the radio resource allocated in accordance with the UL grant allocated to the terminal 1. Further, the BS may receive the UL data through a predetermined radio resource region allocated to the terminal 2.

Further, at operation S1204, the BS may determine whether a received signal that exceeds a threshold value exists in the corresponding radio resource. In the present disclosure, a process of determining whether the received signal that exceeds the threshold value exists may be called DTX detection. If the signal that exceeds the threshold value does not exist, the BS may determine that the terminal 1 has failed to receive the UL grant and thus does not perform the corresponding UL data transmission, and may proceed to operation S1202.

The threshold value for the DTX detection may be expressed as an energy level of a received signal or a signal-to-interference ratio (SIR). Further, the threshold value may be predetermined.

If the received signal that exceeds the threshold value exists as the result of the DTX detection (if no DTX is determined), the BS, at operation S1205, may perform decoding of the received data.

If the decoding has been successfully completed as the result of the decoding, the BS may transfer the data decoding result to an upper layer and may complete the related processing.

If the decoding has failed, the BS, at operation S1206, may determine whether the radio resource allocated to the terminal 1 and the radio resource pre-configured to the terminal 2 overlap each other. As described above, a region in which the radio resource dynamically allocated to the terminal 1 and the radio resource pre-allocated to the terminal 2 overlap each other may be called an overlap region.

If the radio resources do not overlap each other, the BS proceeds to operation S1208 to perform decoding by combining the received data with the data currently stored in the HARQ buffer. Further, if the decoding has succeeded, the BS may transfer the data decoding result to the upper layer, and may complete the related processing.

If the decoding has failed, the BS, at operation S1209, may store the combined data in the HARQ buffer, and then may proceed to operation S1202. That is, the BS may retransmit the UL grant to the terminal 1, so that the terminal 1 retransmits the data. In this case, the BS may allocate the radio resources excluding the radio resource region allocated to the terminal 2 to the terminal 1.

On the other hand, the BS may also request the terminal 2 to perform the retransmission. The BS may transmit the UL grant for the retransmission, or may request the retransmission using NACK information. Since the detailed contents thereof are the same as those as described above, a detailed explanation thereof will be omitted. Further, in the present disclosure, the operation of requesting the second terminal to retransmit the data may be omitted.

If the radio resource allocated to the terminal 1 and the radio resource pre-configured to the terminal 2 overlap each other, the BS may recognize that the decoding has failed due to collision of the radio resources, and may proceed to operation S1207.

At operation S1207, the BS may skip an operation of storing the received data in the HARQ buffer. Accordingly, combining of the next retransmission UL data with the received data including the interference signal can be avoided to heighten the data decoding probability. Thereafter, the BS may proceed to operation S1202. That is, the BS may transmit the retransmission UL grant to the terminal 1, so that the terminal 1 retransmits the data. In this case, if possible, the BS may allocate the radio resources excluding the radio resource region allocated to the terminal 2 to the terminal 1.

On the other hand, the BS may also request the terminal 2 to perform the retransmission. Since the detailed contents thereof are the same as those as described above, a detailed explanation thereof will be omitted. Further, in the present disclosure, the operation of requesting the second terminal to retransmit the data may be omitted.

As a modified example of the operation S1206, the BS may additionally determine how much the radio resource allocated to the terminal 1 and the radio resource pre-configured to the terminal overlap each other. That is, the BS may determine the amount of overlap resources. For example, if the amount of the overlap resources is equal to or smaller than a threshold value, the BS determines that the decoding performance influence due to the interference is low, and may perform decoding through combining the data received at operation S1208 with the data currently stored in the HARQ buffer. In contrast, if the amount of the overlap resources is larger than the threshold value, the BS determines that the decoding performance influence due to the interference is high, and may skip the operation of storing the data received at operation S1207 in the HARQ buffer.

Figure 13:
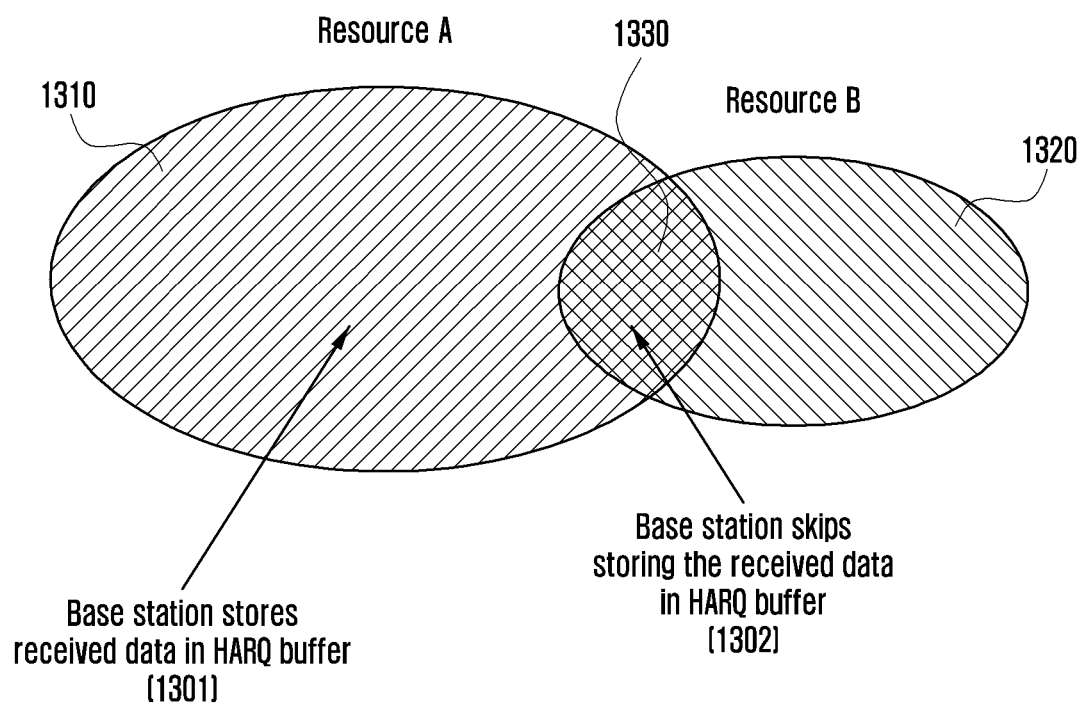
FIG. 13 is a diagram illustrating a method for managing a hybrid automatic repeat request (HARQ) buffer according to an embodiment of the present disclosure.

FIG. 13 is a diagram illustrating a method for managing an HARQ buffer according to an embodiment of the present disclosure.

FIG. 13 illustrates schemes for managing an HARQ buffer of a BS in accordance with radio resources in an example in which the grant-based radio resource (resource A) 1310 and a grant-free radio resource (resource B) 1320 are separately operated, but a partial overlap thereof is permitted.

As described above with reference to FIG. 12, if a resource through which data has been received belongs to a grant-based radio resource (resource A) 1310 that is a dynamically allocated resource region, but does not belong to a grant-free radio resource (resource B) 1320 that is a predetermined resource region in the case where the decoding of the received data has failed, the BS may store the corresponding received data in the HARQ buffer, and then may prepare a combining operation with the next HARQ retransmission (1301). That is, if the resource through which the data has been received is not an overlap region (1310), the BS may store the received data in the HARQ buffer.

If the resource through which the data has been received belongs to both the grant-based radio resource (resource A) 1310 and the grant-free radio resource (resource B) 1320 (1330) in the case where the decoding of the received data has failed, the BS may skip the storing of the data in the HARQ buffer, so that the received data is not combined with the next HARQ retransmission (1302).

Figure 14:
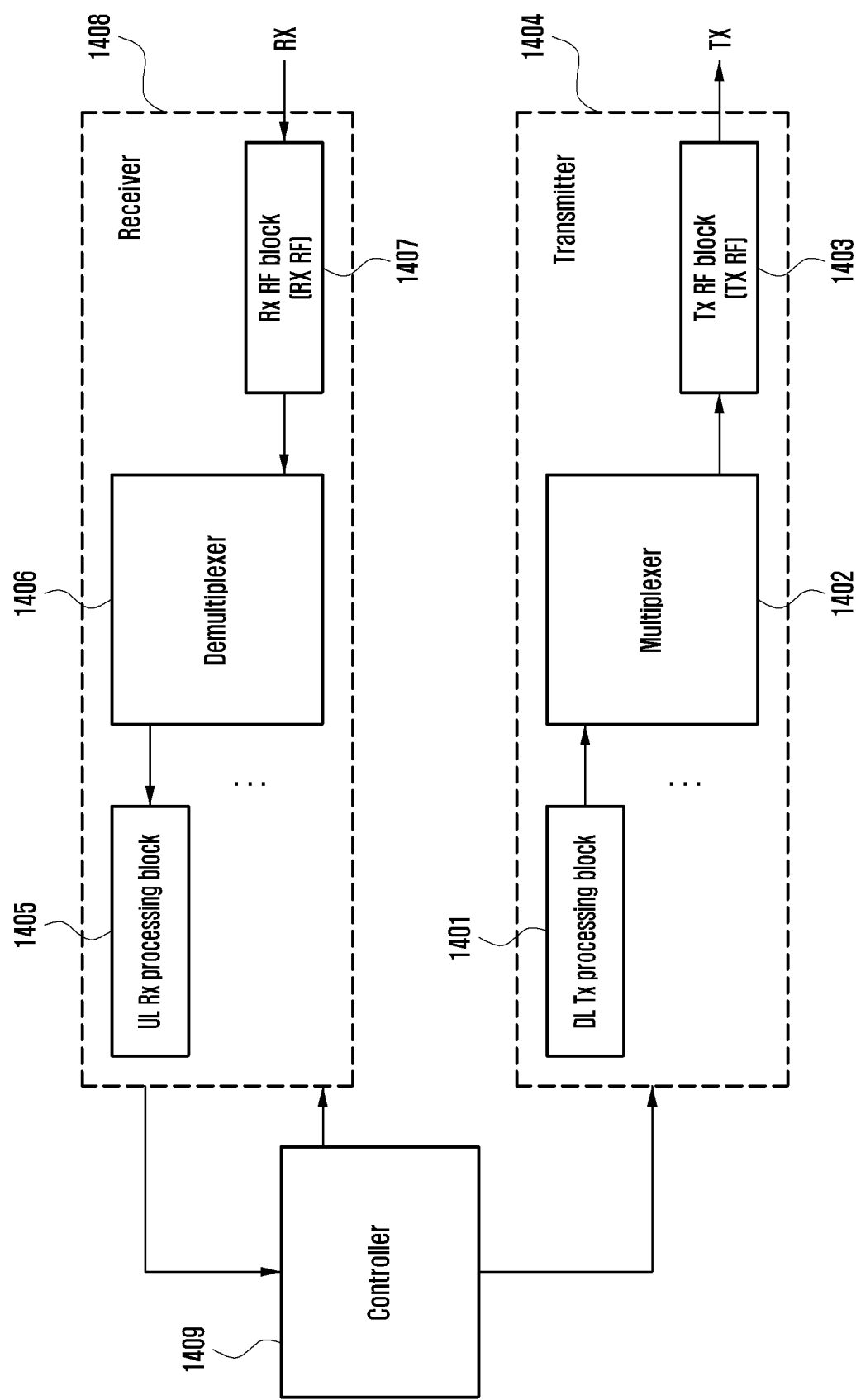
FIG. 14 is a diagram illustrating the configuration of a BS device according to an embodiment of the present disclosure.

FIG. 14 is a diagram illustrating the configuration of a BS device according to an embodiment of the present disclosure.

For convenience in explanation, illustration and explanation of devices that are not directly related to the present disclosure will be omitted.

Referring to FIG. 14, a terminal may include a transmitter 1404 composed of a DL transmission processing block 1401, a multiplexer 1402, and a transmission RF block 1403, a receiver 1408 composed of an UL reception processing block 1405, a demultiplexer 1406, and a reception RF block 1407, and a controller 1409. For example, when defining a controller in the specification, it may be stated that "the controller may be a circuit, an application-specific integrated circuit or at least one processor."

The controller 1409 may determine whether a resource of UL data received by a BS is a grant-based radio resource, a grant-free radio resource, or an overlap resource, and thus may determine whether to store the received UL data in an HARQ buffer. Further, in accordance with the result of the determination, the controller 1409 may control respective constituent blocks of a receiver 1408 of the BS for receiving an UL signal and constituent blocks of a transmitter 1404 for transmitting a DL signal.

Specifically, the controller 1409 may receive a signal from the terminal. The signal may include a control signal and data.

In this case, the controller 1409 may dynamically allocate the radio resource to the first terminal using control information, and may allocate a predetermined radio resource region to the second terminal using configuration information. In this case, the control information may mean a DCI transmitted through a PDCCH, and the configuration information may mean information transmitted through RRC signaling. Since the detailed contents thereof are the same as those as described above, a detailed explanation thereof will be omitted.

Accordingly, the first terminal dynamically allocated with the radio resource and the second terminal allocated with the predetermined radio resource region may transmit the signals. In this case, the configuration information may include pre-configuration information related to the predetermined radio resource region.

Further, the controller 1409 may determine whether a signal that exceeds a threshold value exists. The controller 1409 may identify whether the signal is received in the radio resource region allocated to the terminal, and may determine whether the signal that exceeds the threshold value exists among the received signals.

In this case, the threshold value may be dynamically determined in accordance with the channel state, or may be predetermined.

If the signal that exceeds the threshold value does not exist, the controller 1409 may determine that the terminal cannot receive the UL grant and thus has not transmitted data.

In contrast, if the received signal that exceeds the threshold value exists, the controller 1409 may perform decoding of the received signal.

If the decoding has succeeded, the controller 1409 may transfer the decoding result to an upper layer and may complete the related processing. In contrast, if the decoding has failed, the controller 1409 may determine whether the resource through which the signal has been transmitted is an overlap radio resource.

In the case of receiving the signal in the overlap region, the controller 1409 may skip an operation of storing the received signal in the buffer.

However, even in the case of receiving the signal in the overlap region, the controller 1409 may store the received signal in the buffer through identifying the amount of radio resources included in the overlap region. If the amount of the radio resources included in the overlap region is small, the interference influence may be lowered. Accordingly, if the amount of the radio resources included in the overlap region is smaller than the threshold amount of resources, the controller 1409 may store the received signal in the buffer. However, a process of identifying the amount of radio resources included in the overlap region may be omitted.

Further, the controller 1409 may request the terminal to retransmit the data, and may receive the signal.

Specifically, the controller 1409 may transmit the UL grant for the retransmission to the first terminal, and the first terminal may retransmit the data using the radio resource information included in the UL grant. Further, in order to avoid interference with the signal transmitted by the second terminal, the controller 1409 may allocate the radio resources excluding the predetermined radio resource region to the first terminal.

The controller 1409 may also request the second terminal to perform the retransmission. The controller 1409 may transmit the UL grant for the retransmission, or may request the retransmission using NACK information. Since the detailed contents thereof are the same as those as described above, a detailed explanation thereof will be omitted.

In contrast, if the resource through which the signal has been transmitted is not included in the overlap region, the controller 1409 may store the signal in the buffer. Further, the controller 1409 may request the first terminal to retransmit the data through transmission of the UL grant. Further, the controller 1409 may request the retransmission of the UL data through transmission of the UL grant or NACK information to the second terminal.

Accordingly, the controller 1409 may receive the UL data again, and may combine the received data with the data stored in the buffer to perform the decoding. Further, the controller 1409 may control the operation of the BS as described above according to the present disclosure.

The DL transmission processing block 1401 of the transmitter 1404 of the BS may generate a signal to be transmitted through performing processes, such as channel coding and modulation. The signal generated from the DL transmission processing block 1401 is multiplexed with other DL signals by the multiplexer 1402, and then processed by the transmission RF block 1403 to be transmitted to the BS.

The receiver 1408 of the BS may distribute the signal received from the terminal to respective UL reception processing blocks through demultiplexing of the signal. The UL reception processing block 1405 may acquire the control information or data transmitted by the terminal through performing processes, such as demodulation and channel decoding, with respect to the UL signal of the terminal. The BS receiver 1408 may apply the output result of the UL reception processing block to the controller 1409 to support the operation of the controller 1409. The transmitter and the receiver of the present disclosure may be configured as a transceiver.

While the present disclosure has been shown and described with reference to various embodiments thereof, it will be understood by those of skilled in the art that various changes in form and details may be made therein without departing from the spirit and scope of the present disclosure as defined by the appended claims and their equivalents.

What is claimed is:

1. A method performed by a base station in a wireless communication system,
   the method comprising:
   receiving, from a user equipment, a signal having a signal strength that is higher than a threshold value;
   identifying whether decoding of the signal fails;
   in case that decoding of the signal fails, identifying whether resources on which the signal is received are in an overlapped portion of a first resource region and a second resource region; and
   skipping storage of the signal in a buffer when decoding of the signal fails and in case that the resources on which the signal is received are in the overlapped portion and that an amount of the resources in the overlapped portion exceeds a threshold amount of resources.

2. The method of claim 1.
   wherein the first resource region is dynamically allocated by control information, and
   wherein a grant-based uplink transmission is performed on the first resource region.

3. The method of claim 1,
   wherein the second resource region is predetermined, and
   wherein a grant-free uplink transmission is performed on the second resource region.

4. The method of claim 1, wherein the buffer includes a hybrid automatic repeat request (HARQ) buffer.

5. The method of claim 1, wherein the signal is an uplink signal transmitted by the user equipment.

6. A base station in a wireless communication system, the base station comprising:
   a transceiver; and
   a controller configured to:
   receive, via the transceiver, from a user equipment, a signal having a signal strength that is higher than a threshold value,
   identify whether decoding of the signal fails,
   in case that decoding of the signal fails, identify whether resources on which the signal is received are in an overlapped portion of a first resource region and a second resource region, and skip storage of the signal in a buffer when decoding of the signal fails and in case that the resources on which the signal is received are in the overlapped portion and that an amount of the resources in the overlapped portion exceeds a threshold amount of resources.

7. The base station of claim 6, wherein the first resource region is dynamically allocated by control information, and wherein a grant-based uplink transmission is performed on the first resource region.

8. The base station of claim 6, wherein the second resource region is predetermined, and wherein a grant-free uplink transmission is performed on the second resource region.

9. The base station of claim 6, wherein the buffer includes a hybrid automatic repeat request (HARQ) buffer.

10. The base station of claim 6, wherein the signal is an uplink signal transmitted by the user equipment.

* * * * *